United States Patent [19]

Molyneaux

[11] 4,291,660
[45] Sep. 29, 1981

[54] RECYCLING EXHAUST FUMES VALVE

[76] Inventor: Isaac Molyneaux, 90-41 Corona Ave., Elmhurst, N.Y. 11737

[21] Appl. No.: 125,321

[22] Filed: Feb. 28, 1980

[51] Int. Cl.³ ............................................. F02M 25/06
[52] U.S. Cl. ..................... 123/568; 123/574; 123/569; 137/481; 137/530; 137/539; 251/176
[58] Field of Search ....................... 123/568, 574, 569; 137/481, 539, 530; 251/176

[56] References Cited

U.S. PATENT DOCUMENTS

| | | | |
|---|---|---|---|
| 1,552,819 | 9/1925 | Brush et al. | 123/568 |
| 3,225,752 | 12/1965 | Robinson | 123/574 |
| 3,646,925 | 3/1972 | Eshelmann | 123/574 |
| 3,741,179 | 6/1973 | Vartanian | 123/568 |
| 4,151,819 | 5/1979 | Inada et al. | 123/568 |

FOREIGN PATENT DOCUMENTS 2740465  3/1979  Fed. Rep. of Germany ...... 123/568

Primary Examiner—Wendell E. Burns
Attorney, Agent, or Firm—Richard L. Miller

[57] ABSTRACT

A system incorporated with an internal combustion engine for recycling engine exhaust fumes back into the engine for a more thorough burning before final discharge; the system including a one way valve unit installed along a line between the muffler and the engine intake manifold.

1 Claim, 4 Drawing Figures

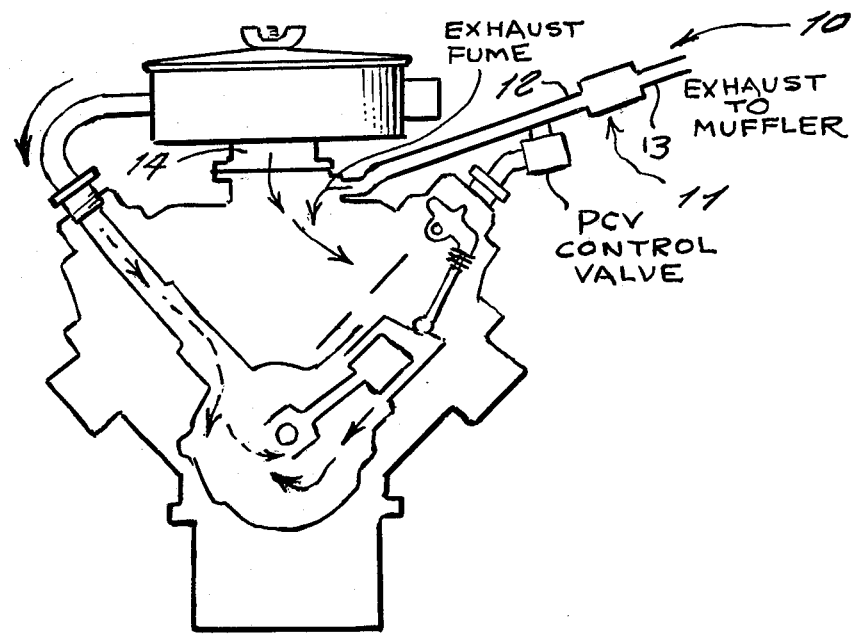
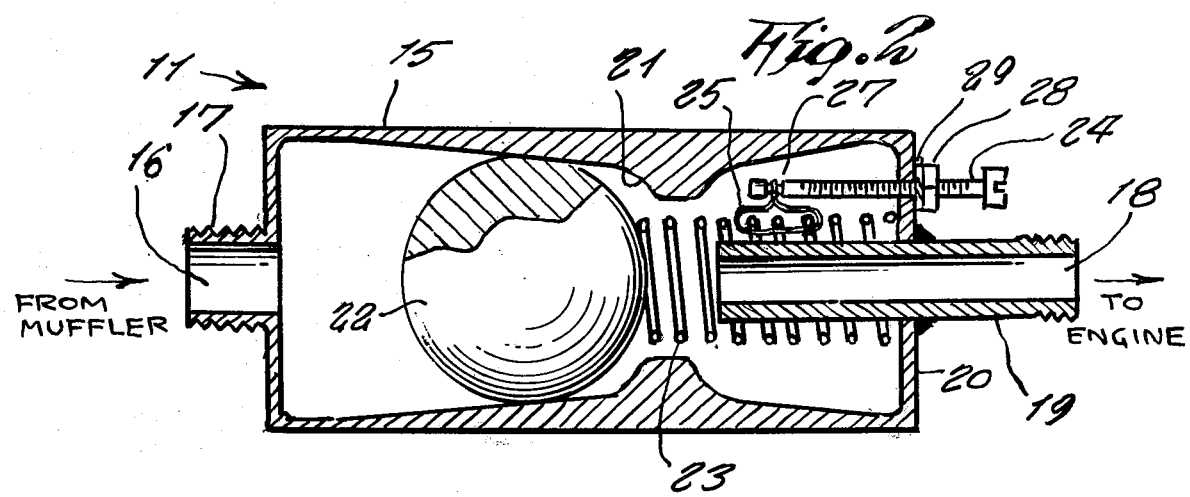
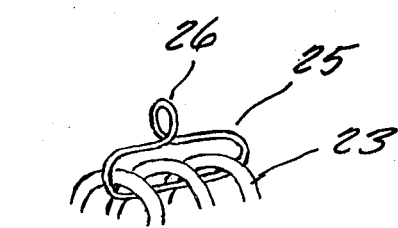
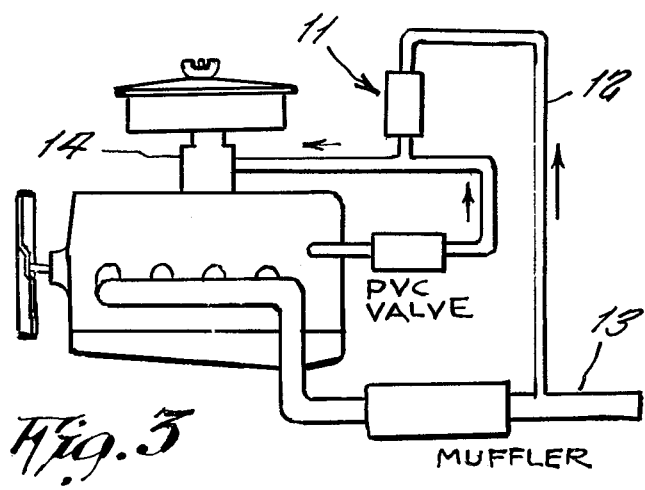

RECYCLING EXHAUST FUMES VALVE

BACKGROUND OF THE INVENTION

This invention relates generally to internal combustion engines.

It is well known that when fuel is burned in an internal combustion engine in a conventional manner, the fuel is not thoroughly oxidized so that some of the fuel is discharged unburned out of the engine exhaust. This is a waste of fuel energy, while at a same time it contributes to pollution of the atmosphere, so that this situation is therefore in need of an improvement.

SUMMARY OF THE INVENTION

Accordingly it is a principal object of the present invention to provide an accessory mountable on an internal combustion engine, which causes exhaust fumes from the engine to be recycled back into the engine cylinders for a further more complete burning before being discharged into the atmosphere.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic cross sectional end view of an engine and the invention installed thereupon.

FIG. 2 is an enlarged cross sectional view of the valve of the invention.

FIG. 3 is a diagrammatical side view of the engine and the invention.

FIG. 4 is an enlarged detail of a spring-grasping ring shown in FIG. 2.

DETAILED DESCRIPTION OF A PREFERRED EMBODIMENT

Referring now to the drawing in greater detail, the reference numeral 10 represents an accessory according to the present invention, and which includes a valve unit 11 installed along a pipe line 12 which at one end is connected to the engine exhaust pipe 13, and which at its other end is connected to the engine's intake manifold 14.

The valve unit includes a cylindrical case 15 which at one end has an intake opening 16 through a threaded nipple 17. The opposite end has an outlet opening 18 through a pipe 19 secured through the case end wall 20. A longitudinally intermediate portion of the case wall is inwardly constricted so to form a seat 21 against which a spherical ball 22 seats so as to close an axial passage through the valve. The ball is located in the inlet side of the valve unit, adjacent the intake opening 16.

A compression coil spring 23 between end wall 20 and the ball, normally urges the ball to be unseated from the seat 21. The compression force of the spring is selectively manually controlled by a bolt 24 screwed through the end wall 20 and which at its inner end carries a ring 25 that encircles three turns of the spring so that as the ring is axially moved, the portion of the spring between the ring and the ball can be selectively weakened or strengthened in force for keeping the ball unseated. The ring includes an eyelet 26 that turns in an annular groove 27 of the bolt. A nut 28 and lockwasher 29 secure the bolt in set position.

In operative use, when the engine is accelerated, the exhaust pressure is increased, thus causing the valve unit 11 to close, by means of the ball seating against the seat.

This action is necessary because during acceleration the increased exhaust pressure would reduce the manifold intake and cause the engine to become inefficient and possibly even stall.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. An accessory mounted on an internal combustion engine for recycling exhaust fumes thereof, comprising in combination, a valve unit mounted along a pipe connected between an exhaust pipe of the engine and an intake manifold of the engine, said valve comprising a cylindrical casing having a first inlet end in fluid communication with the exhaust pipe, and a second outlet end having a pipe extending in said casing toward said first end in fluid communication with the intake manifold; said cylindrical casing having a conical valve seat formed therein between said second outlet end and said first inlet end; a spherical ball positioned within said cylindrical casing between said first inlet end and said valve seat for movement therebetween, said valve seat being formed by said cylindrical casing and including a constricted portion extending from near said first inlet end toward said second outlet end and terminating in an annular flange portion near said second outlet end; a compression spring mounted about said pipe having a first end adjacent said second outlet end of said casing and a second end extending beyond said annular flange, said second end of said spring abutting against said spherical ball to urge said ball toward said first inlet end, said spherical ball being closed in said conical seat when the gas pressure from said first inlet end is greater than the force exerted by said compression spring; and a means for varying the compression force of said spring, said means comprising a threaded bolt extending through said second outlet end of said cylindrical casing, said threaded bolt having a first end outside of said casing and a second end in said casing in close proximity to said spring, said second end of said threaded bolt having a groove formed therein, said means further comprising a ring through which a plurality of turns of said spring pass, said ring having an eyelet formed remote from said plurality of turns positioned in said groove of second end of said threaded bolt, whereby the force of said compression spring on said ball may be varied by turning said threaded bolt and therefore varying the location of said plurality of turns.

* * * * *